(12) United States Patent
Tiao et al.

(10) Patent No.: US 6,318,863 B1
(45) Date of Patent: Nov. 20, 2001

(54) ILLUMINATION DEVICE AND IMAGE PROJECTION APPARATUS INCLUDING THE SAME

(75) Inventors: Kuo-Tung Tiao, Hsinchu; Fu-Ming Chuang, Hsinchu Hsien; Jinn-Chou Yoo, Hsinchu; Sheng-Hsiung Chan; Tzeng-Ke Shiau, both of Hsinchu Hsien, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/394,308

(22) Filed: Sep. 10, 1999

(30) Foreign Application Priority Data

Jan. 21, 1999 (TW) .................................................. 88100890

(51) Int. Cl.$^7$ .................................................. G03B 21/28
(52) U.S. Cl. ................................ 353/31; 353/98; 353/94; 349/61
(58) Field of Search ........................ 353/20, 38, 31, 353/33, 34, 37, 94, 98; 345/82; 349/61, 62, 69, 70; 385/901, 116, 133; 362/800

(56) References Cited

U.S. PATENT DOCUMENTS

| | | | | |
|---|---|---|---|---|
| 4,735,495 | * | 4/1988 | Henkes | 362/347 |
| 5,347,433 | * | 9/1994 | Sedlmayer | 362/32 |
| 5,398,086 | * | 3/1995 | Nakano et al. | 353/31 |
| 5,765,934 | * | 6/1998 | Okamori et al. | 353/94 |
| 5,808,800 | * | 9/1998 | Handschy et al. | 359/630 |
| 5,829,858 | * | 11/1998 | Levis et al. | 353/122 |
| 5,971,545 | * | 10/1999 | Haitz | 353/31 |

* cited by examiner

*Primary Examiner*—William Dowling
(74) *Attorney, Agent, or Firm*—Jiawei Huang; J. C. Patents

(57) ABSTRACT

An illumination device and an image projection apparatus having the same. The illumination device has a light source with multiple light emitting devices and an uniform illuminating means evenly distributed in front of the light source. The light emitted from the light source can thus uniformly project on a light valve. In addition, a polarization converter is used to convert the light into a usable polarization type, so as to increase the illumination efficiency. The image projection apparatus basically has three of the above mentioned illumination devices to emit three elementary color lights projecting onto a screen.

28 Claims, 15 Drawing Sheets

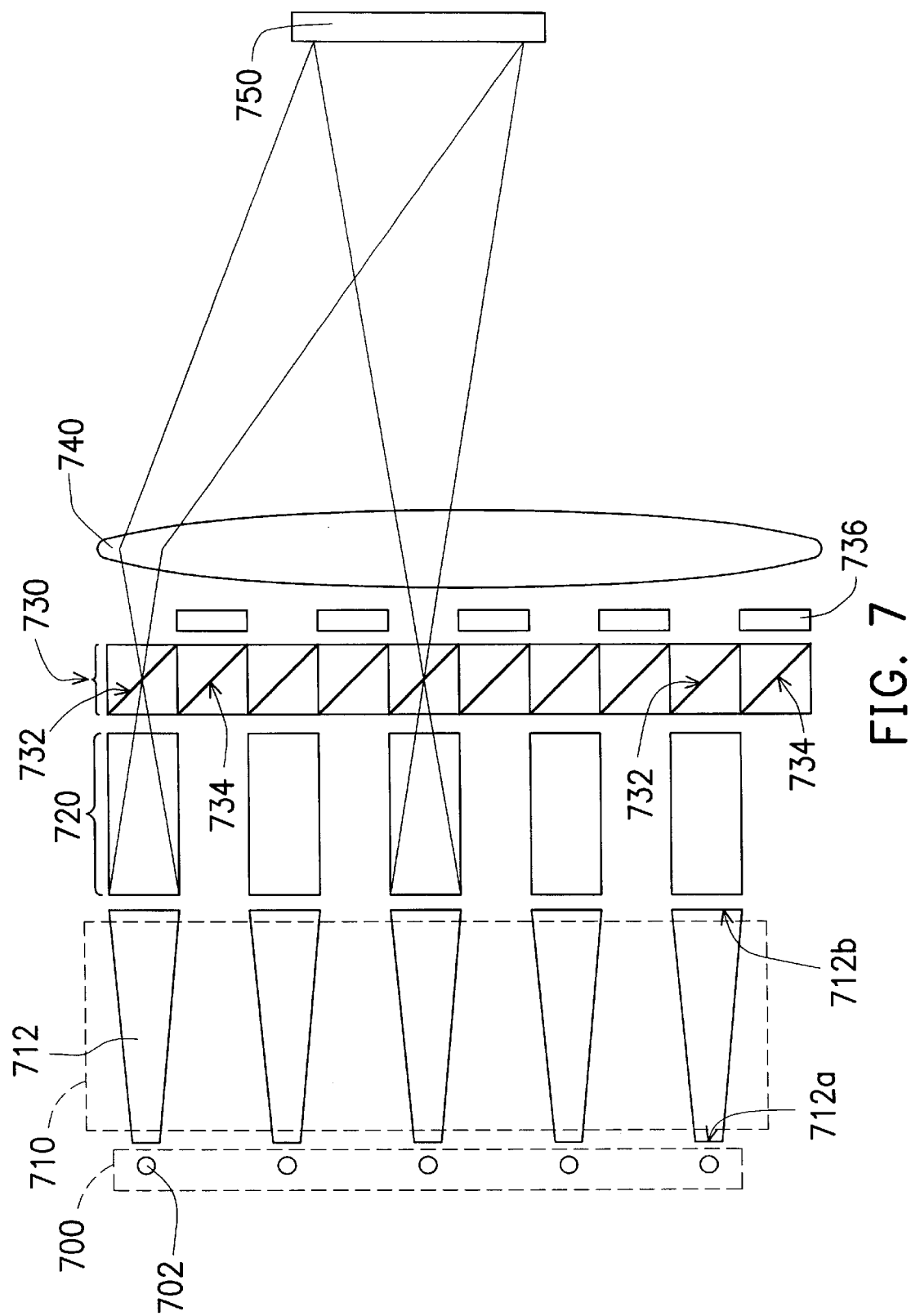

ILLUMINATION DEVICE AND IMAGE PROJECTION APPARATUS INCLUDING THE SAME

CROSS-REFERENCE TO RELATED APPLICATION

This application claims the priority benefit of Taiwan application serial no. 88100890, filed Jan. 21, 1999, the full disclosure of which is incorporated herein by reference.

BACKGROUND OF THE INVENTION

1. Field of the Invention

The invention relates in general to an illumination device. More particularly, this invention relates to an illumination device of a display.

2. Description of the Related Art

The conventional projection apparatus is basically applied to a front projection type or a large screen back projection type display. Light sources such as halogen lamps and arc lamps with enough luminance, for example, high pressure mercury lamp, metal halogen lamp, and xenon lamps, have to be used. These kinds of lamps have the advantage of high luminance, but also have the disadvantages such as high power consumption, short lifetime and high temperature. Therefore, these kinds of lamps are only used while a high luminance is required.

Referring to both FIG. 1A and FIG. 1B, two conventional illumination devices are shown schematically. FIG. 1A shows a projection apparatus disclosed in U.S. Pat. No. 5,418,583. A first lens array 20 and a second lens array integrator 30 are used to achieve the uniformity of a light source 10, followed by projecting the light onto a light valve 40. FIG. 1B shows another projection apparatus disclosed in U.S. Pat. Nos. 4,656,562 and 5,634,704. A light pipe integrator 25 and a lens 35 are used to uniformize a light source 10 and to project the uniform light onto a light valve 40. In Both FIGS. 1A and 1B, halogen lamps or various kinds of arc lamps have to be used to obtain the required luminance. Therefore, both of these two conventional projection apparatus have disadvantages such as high power consumption, short lifetime, abundant ultra-violet irradiation and high temperature. These conventional projection apparatus are thus not suitable for use in a display with a small feature size.

A desktop display normally has a diagonal length less than about 30 inches. Thus, the high luminance required by those large screens or display is not demanded for a desktop display. In addition, the desktop display is very often in an on status, so that a light source has to continuously provide a light for illumination. Again, those conventional illumination devices which use high pressure mercury lamp do not have enough lifetime are not suitable for use as a desktop display.

Apart from the high power consumption, short lifetime, and high temperature, the light source with a high luminance further has the disadvantages of hazard in application and high fabrication cost.

SUMMARY OF THE INVENTION

The invention provides an illumination device. Multiple light emitting devices are used as a light source. The light emitting devices have advantages such as low power consumption, long lifetime, and generating low thermal energy. Since lights emitted from the multiple light emitting devices overlay on a light valve, the lifetime of the illumination device is increased by an order of the number of the light emitting devices. The uniformity of the light displayed on the light valve is also enhanced. Since the light source with high luminance is not used, so that the drawbacks in the conventional illumination devices are resolved. In addition, since less thermal energy is generated, materials such as plastic can be used for optical lens to reduce the fabrication cost.

In one aspect, the invention further provides a projection apparatus using the above mentioned illumination devices. The light emitting from the illumination devices travels through the projection apparatus and projects onto a screen. The projection apparatus using the illumination devices have the advantages of low cost and high efficiency.

In one embodiment of the invention, an illumination device including a light source and a uniform illuminating means are provided. The illumination device has multiple light emitting devices, while lights emitted from the light emitting devices are uniformized by the uniform illuminating means to project onto a light valve, for example, a LCD for display.

Since most of the light valve can accept polarized light, therefore, the polarization converter is frequently used to efficiently utilize the light provided by the illumination device.

Both the foregoing general description and the following detailed description are exemplary and explanatory only and are not restrictive of the invention, as claimed.

BRIEF DESCRIPTION OF THE DRAWINGS

FIG. 7 shows the sixth embodiment of an illumination device of the invention;

DESCRIPTION OF THE PREFERRED EMBODIMENTS

First Embodiment

Figure 2A:
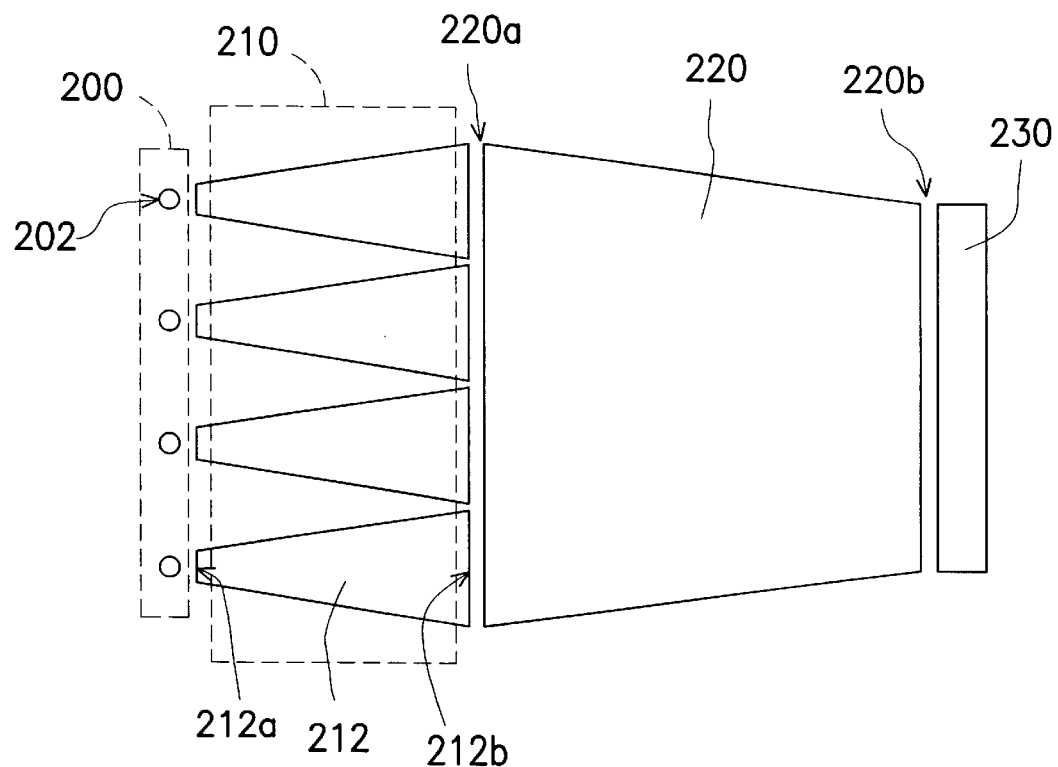
FIG. 2A shows an illumination device in one embodiment of the invention.
Figure 2B:
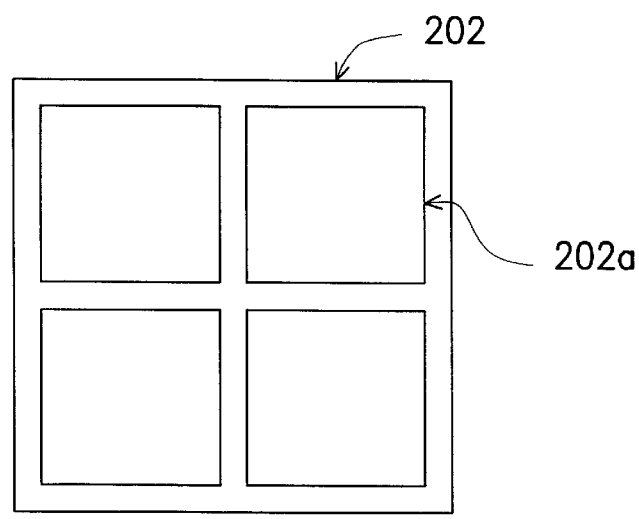
FIG. 2B shows a light-emitting module used in the illumination device shown in FIG. 2A.

FIG. 2 shows a first embodiment of an illumination device in the invention. In this embodiment, a taper light pipe is used for the illumination device.

The illumination device comprises a light source 200 including an array of multiple light emitting modules 202 and an array of taper light pipes 210. The array of taper light pipe 210 comprises multiple light pipe 212. Each taper light pipe 212 has a first end 212a and a second end 212b. The first end 212a of each taper light pipe 212 is closely connected with each of the light emitting modules 202. Therefore, light emitted from each light emitting module 202 is collected by a corresponding taper light pipe 212. While traveling through the taper light pipe 212, the light has being uniformized and emitted from the second end 212b with a narrowed angle. The illumination device further comprise a taper light pipe 220 with a wider end 220a disposed at the second ends 212b of the array of the taper light pipes 210. The uniformed light traveling through the taper light pipe 220 and then emits from a narrow end 220b of the taper light pipe 220 and uniformly projects on a light valve 230.

The light emitting devices 202a may be selected from those low power luminescence devices such as light emitting diodes (LED), organic light emitting diodes (OLED), laser diode (LD), electro-luminescence devices (EL), field emission displays (FED) and cold cathode fluorescence lamps (CCFL). The light valve 230 includes, for example, a liquid crystal display.

After entering each of the corresponding taper light pipes 212 from the first ends 212a, each light emitted from each light emitting module 202 travels through the internal surfaces of the taper light pipes 212 with total internal reflection or just reflection from the wall. While reaching the second end 212b, the light becomes a collimated and uniformized. The taper light pipe 212 can also be in a cone shape, that is, with a smaller aperture of the first end 212a and a larger aperture of the second end 212b.

The collimated light then travel through a taper light pipe 220 from the end 220a, thereof, and superimposition with each other on the light valve 230 at the other end 220b.

The end 220a of the taper light pipe 220 covers the range of the seconds 212b of the array of taper light pipes light pipe 210, while the end 220b has a surface area about the same of the surface area of the light valve 230.

In addition, the taper light pipes can be made of plastic with a reduced cost. From the above description, the invention provides an illumination devices with a uniform light incident on a light valve with a low fabrication cost.

Second Embodiment

Figure 3A:
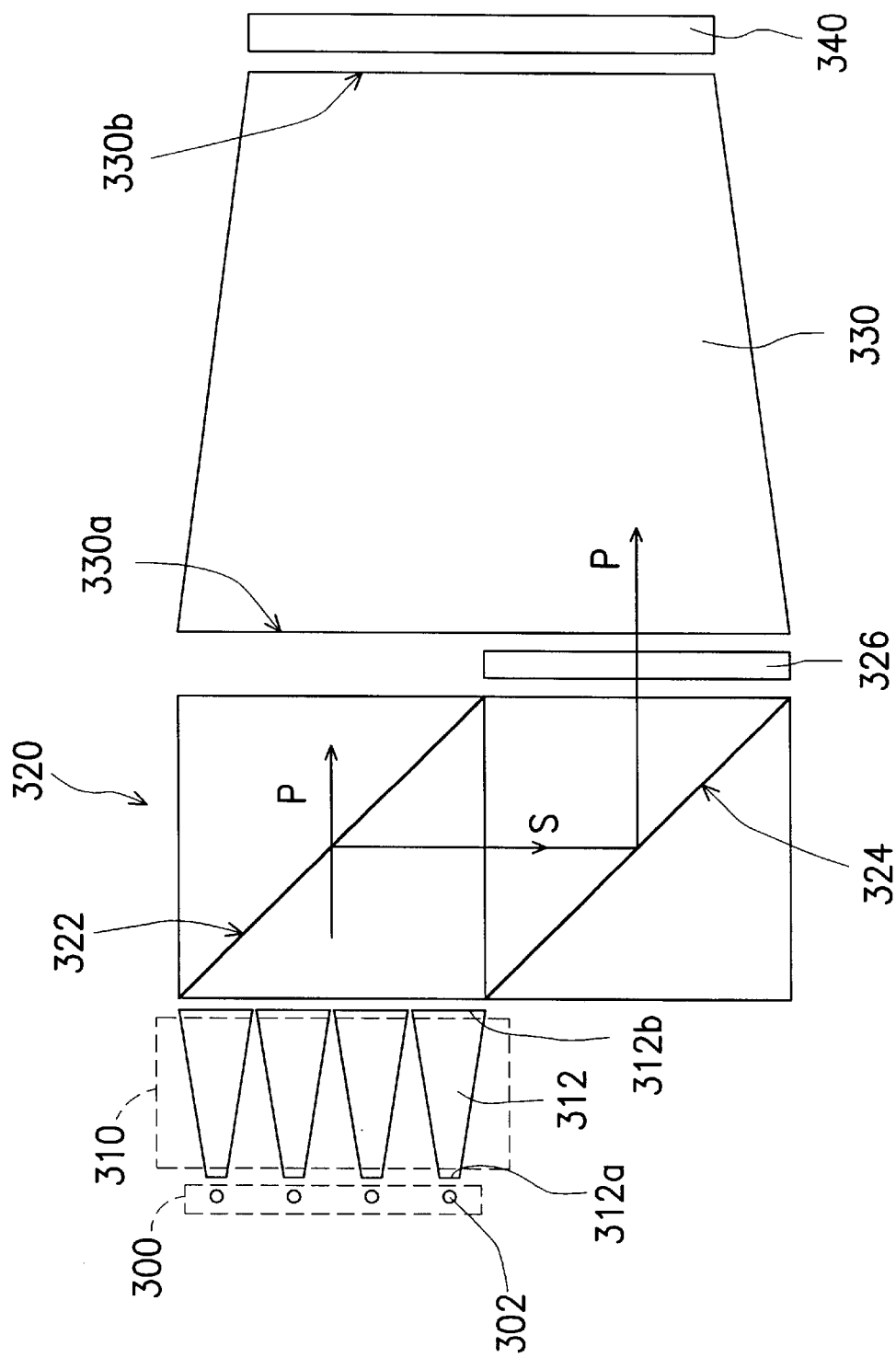
FIG. 3A shows the second embodiment of an illumination device of the invention.

FIG. 3A shows a schematic drawing of an illumination device of a second embodiment of the invention. In this embodiment, an array of taper light pipes are used for uniformity of the light, while a polarization converter is used to convert the light into a polarization type that a light valve can accept. The efficiency of the illumination device can thus be enhanced.

As shown in FIG. 3A, an illumination device comprising a light source 300 including multiple light emitting modules, an array of taper light pipes 310, a polarization converter 320, and a taper light pipe 330. The array of taper light pipes 310 comprises multiple taper light pipes 312 each of which further has two ends 312a and 312b. The light emitted from the light source 300 enters the array of the taper light pipes 312 from the surface 312a. Travelling through the taper light pipes 312, the light becomes a narrow angle light from a wide angle light. The narrow angle light is then incident onto the polarization converter 320 from the end 312b of the taper light pipes 312.

The polarization converter 320 comprises a first polarization beam splitter 322 and a second polarization beam splitter 324 arranged parallel with each other. The first polarization beam splitter 322 is arranged with an angle, for example, 45 degree, with the array of taper light pipes 310. When the light comes out from the second end 312b of the taper light pipes 312, a first polarization type (for example, P-type) light transmits through the first polarization beam splitter 322, while the second polarization type (for example, S-type) light is reflected and incident onto the second polarization beam splitter 324. Being further reflected by the second polarization beam splitter 324, the second polarization type light transmits through a half-wave plate 326 to be converted into a first polarization type light. The taper light pipe 330 is disposed in front of the polarization converter 320 to receive the first polarization type light coming out from the polarization converter 320. Similarly, the taper light pipe 330 comprises a first surface 330a to receive incoming light, and a second surface 330b to projecting light onto a light valve 340.

The dimensions the second surface 330b of the taper light pipe 330 is similar to that of the light valve 340. In the polarization converter 320, the second polarization beam splitter 324 is functioned to reflect an incoming light reflected from the first polarization beam splitter 322 only. Therefore, the second polarization beam splitter 324 can be replaced with a mirror to achieve the same effect.

The same as the first embodiment, the light emitting modules 302 can be selected from those low power consuming devices such as light emitting diodes, organic light emitting diodes, laser diodes, electro-luminescence devices, field emission display, and cold cathode fluorescence lamp. The light valve can be a liquid crystal display.

The light traveling within the array of taper light pipes 310 is in a way of total internal reflection. A collimated light can be obtained in the second ends of the array of taper light pipes 310. The taper light pipes 312 may be fabricated in a cone shape with a wider aperture close to the light source 300, and a narrower aperture in the far end of the light source.

Assuming that the light valve 340 accept p-wave only, without the polarization converter 320, the light emitted from the light source 300 only has a portion acceptable and thus result in a low intensity. By installing the polarization converter 320, the portion which is not acceptable to the light valve 340, that is, the light other than the p-wave, is converted into the p-wave to be accepted by the light valve 340. Therefore, the intensity of image displayed can be greatly improved. The shape of the taper light pipe 330 is similar to that of the taper light pipes 312. That is, the taper light pipe 330 has a wider first end 330a close to the polarization converter 320 and a narrower end 330b close to the light valve 340 and covers the range of light incident from the polarization converter 322.

Figure 3B:
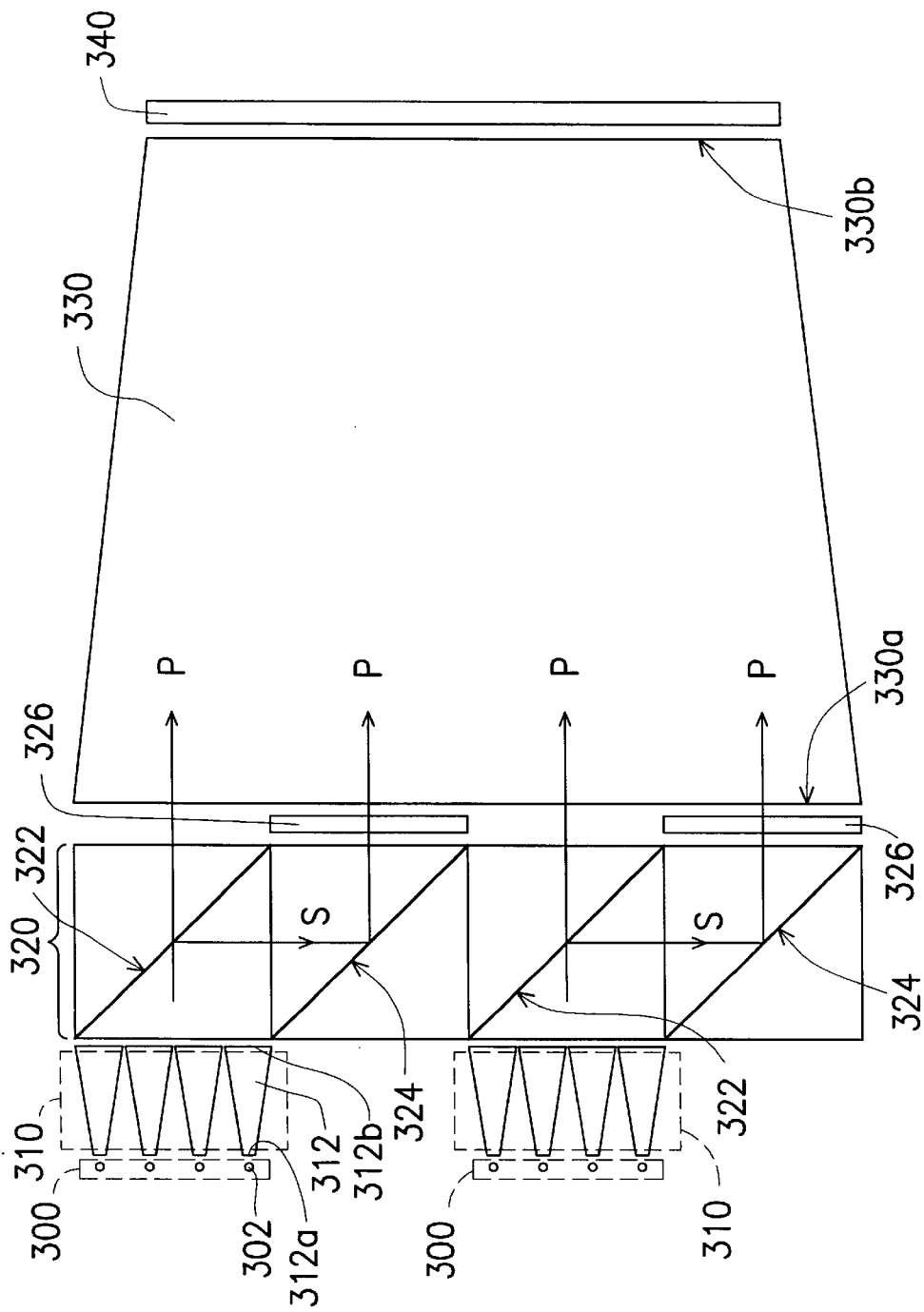
FIG. 3B shows the modification of the illumination device as shown in FIG. 3A.

Referring to FIG. 3B, more than one light sources 300 can be employ in order to further enhance the light flux throughput. In this case, several polarization converters 320 are consequently required to cover the full range emitted from the light sources 300.

Third Embodiment

Figure 4A:
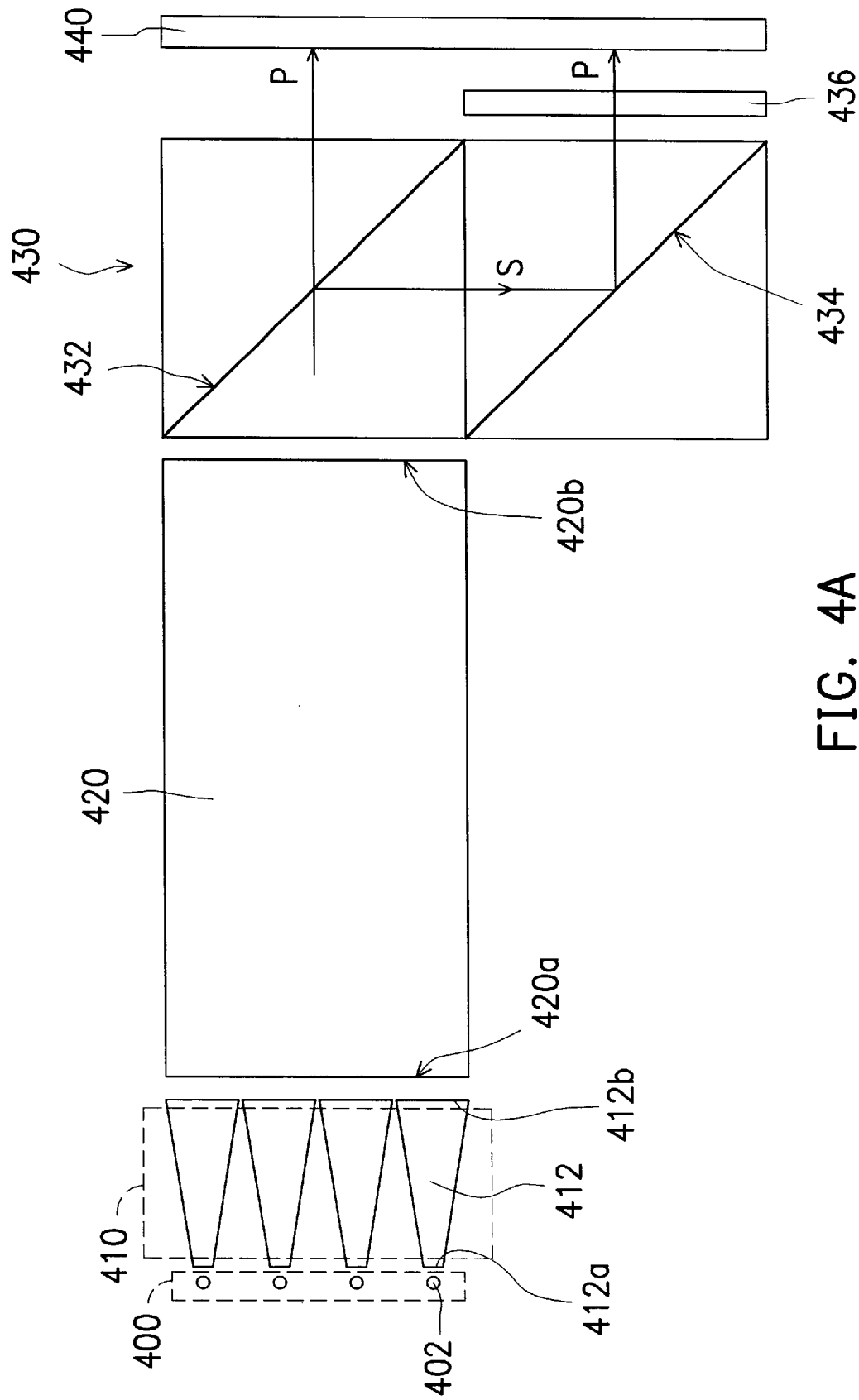
FIG. 4A shows the third embodiment of an illumination device of the invention.

FIG. 4A shows a third embodiment of an illumination device according to the invention. The illumination device comprises a light source 400, an array of taper light pipes 410, a uniform illuminating means 420, and a polarization converter 430. The light source 400 comprises multiple light emitting modules 402. The array of taper light pipes 410 comprises multiple taper light pipes 412 each of which with a first end 412a closely connected to each of the light emitting modules 402. Therefore, the wide angle light emitted from the light source 400 is then collected by the array of taper light pipes 410 from the first end 412a and then travels in a way of total reflection within the taper light pipes 412. Traveling through the taper light pipes 412, the wide angle light becomes a narrow angle light coming out from a second end 412b thereof. The uniform illuminating means 420 disposed in front of the array of taper light pipes 410 comprises a first end 420a and the 420b. The narrow angle light coming out from the array of taper light pipes 410 is incident onto the first end 420a to be unforminzed by the uniform illuminating means 420. Traveling through the uniform illuminating means 420, a uniform light comes out from a second end 420b thereof. The uniform light then enters the polarization converter 430. The polarization converter 430 comprises a first polarization beam splitter 432 and a second polarization beam splitter 434 arranged parallel with each other, and a half wave plate 436. In addition, the first polarization beam splitter 432 and the second end 420b has a certain angle, for example, 45 degree, to allow only a first polarization type light to transmit through. In contrast, the second polarization type light is reflected first by the first polarization beam splitter 432, and again by the second polarization beam splitter 434. The half-wave plate 436 in front of the second polarization beam splitter 434 then converts the second polarization type light into the first polarization type light. Being uniformized and polarized, the light emitted from the light source 400 can then be collected by the light valve 440 with a highly enhanced intensity.

The light emitting modules 402 are selected from low power consumption light emitting devices such as light emitting diodes, organic light emitting diodes, laser diodes, electro-luminescence devices, field emission devices, and cold cathode fluorescence lamps. The light valve can be a liquid crystal display.

Being emitted from each of the light emitting modules 402, each light enters each taper light pipe 412 and being totally reflected. The light is then converged as a narrow angle light. In addition to the cone shape, the shape of the taper light pipes 412 can also be a rectangular shape or a cylindrical shape. In the cone shape, the first end 412a close to the light source 400 has an aperture narrower than that of the second end 412b close to the polarization converter 430.

Assuming that the light valve 440 accept a P-type polarization light only, without the polarization converter 420, the light emitted from the light source 400 only has a portion acceptable and thus result in a low intensity. By installing the polarization converter 420, the portion which is not acceptable to the light valve 440, that is, the light other than the P-type polarization, is converted into the P-type polarization to be accepted by the light valve 440. Therefore, the intensity of image displayed can be greatly enhanced.

Figure 4B:
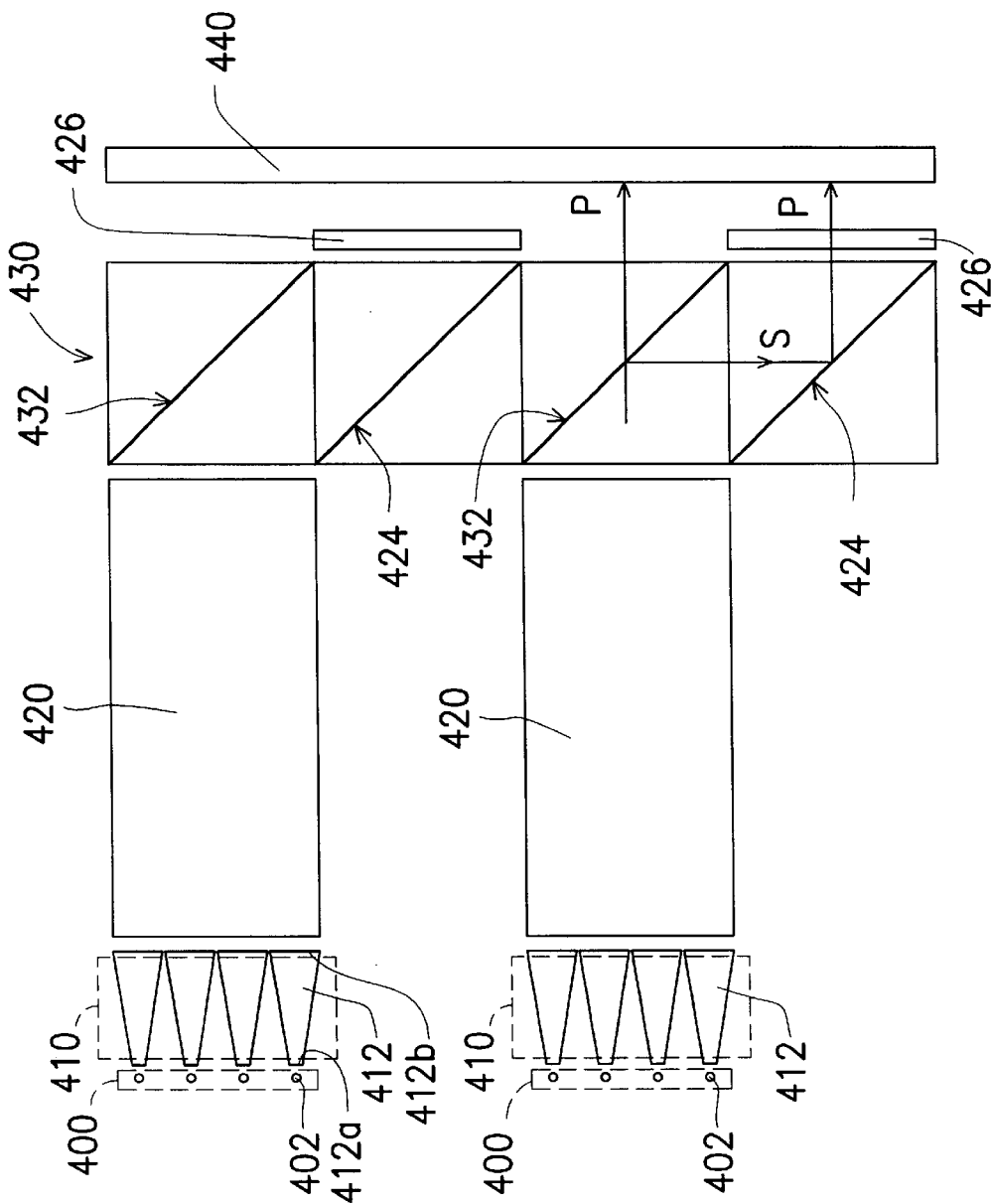
FIG. 4B shows a modification of the illumination device as shown in FIG. 4A.

FIG. 4B shows a modification of the illumination device as shown in FIG. 4A. Similar to the relationship between FIG. 3A and FIG. 3B, more than one light source 410 incorporated with a same number of arrays of taper light pipes 410 are used to construct the illumination device. The light intensity can thus be greatly enhanced. In addition, the taper light pipes can also be made of plastic material to reduce the fabrication cost.

Fourth Embodiment

Figure 5:
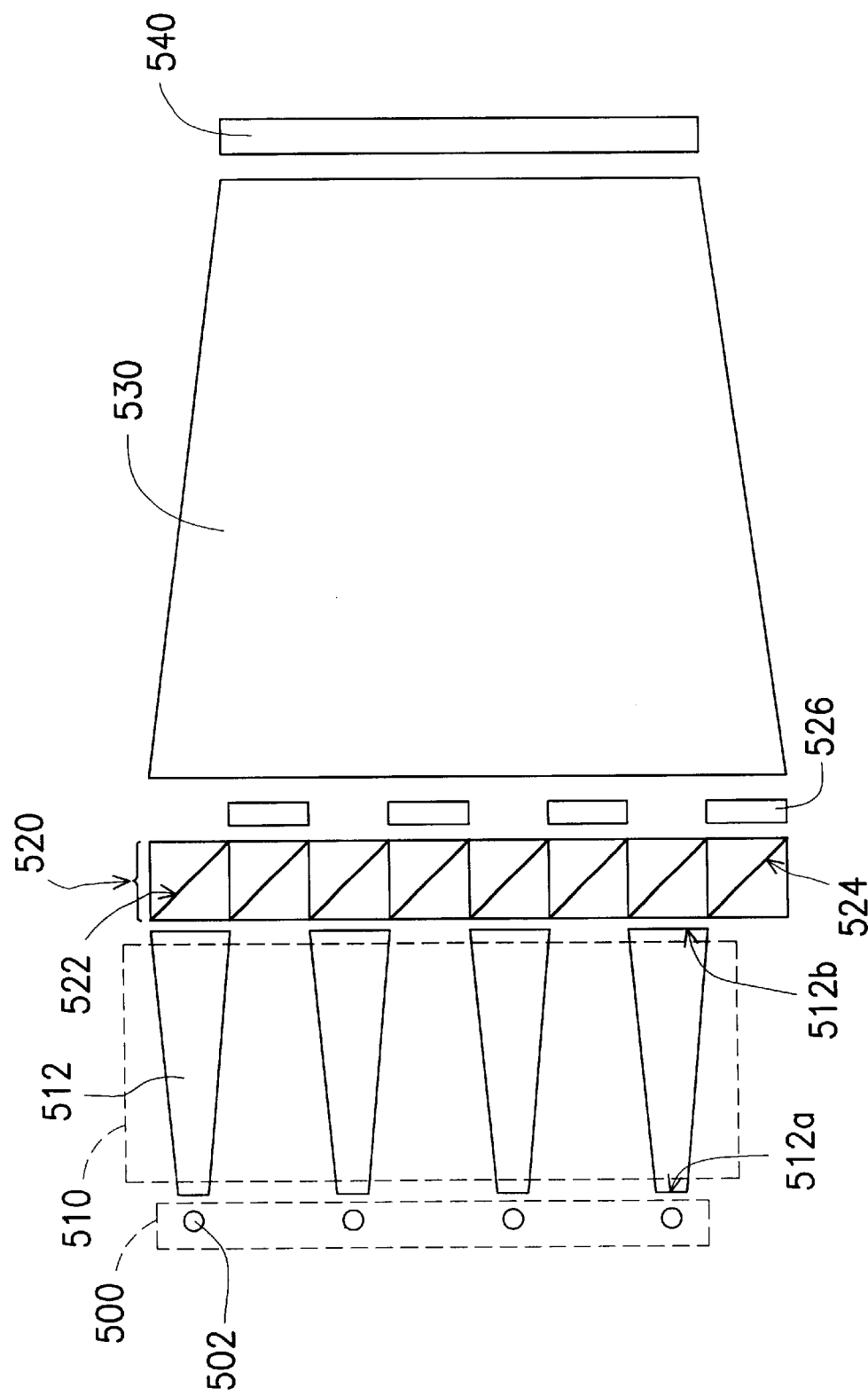
FIG. 5 shows the fourth embodiment of an illumination device of the invention.

FIG. 5 illustrates an illumination device in a fourth embodiment of the invention. The illumination device comprises a light source 500, an array of taper light pipes 510, a polarization converter 520 and a taper light pipe 530. The light source 500 comprises multiple light emitting devices 502. The array of taper light pipes 510 comprises multiple taper light pipes 512. The number of the light emitting devices 502 can be designed the same as the number of the taper light pipes 512. Or alternatively, one taper light pipe 512 may be arranged with more than one light emitting device 502 to have a higher intensity of light coming through. Each of the taper light pipes 512 has a first end 512a facing the light emitting devices 502 and a second end 512b facing the polarization converter 520. When light enters each of the taper light pipes 512, the light travels in a way of total reflection by the inner wall of the taper light pipes 512. In addition, the incident from the light source 500 typically has a wide angle; while the taper light pipes 512 have an effect of narrowing the angle of the light. Therefore, the light coming from the second ends 512b have a narrowed angle compared to the one emitted by the light source 500. In this embodiment, the polarization converter 520 comprises multiple pairs of polarization beam splitters 522 and 524, and one half-wave plate 526 in front of each second polarization beam splitter 524. Each of the first polarization beam splitters 522 is arranged in parallel to each of the second polarization beam splitters 524. Being converted by the polarization converter 520, all the lights emitted from the light source 500 and converged by the array of taper light pipes 510 are converted into a polarization type that a light valve 540 can accept. The identical polarization type of light is then uniformized by a taper light pipe 530, and then incident onto a light valve 540.

The light emitting devices 502 are selected from low power consumption light emitting devices such as light emitting diodes, organic light emitting diodes, laser diodes, electro-luminescence devices, field emission devices, and cold cathode fluorescence lamps. The light valve can be a liquid crystal display.

Being emitted from each of the light emitting devices 512, each light enters each taper light pipe 512 and being totally reflected. The light is then converged as a narrow angle light. In addition to the cone shape, the shape of the taper light pipes 512 can also be a rectangular shape or a cylindrical shape. In the cone shape, the first end 512a close to the light source 500 has an aperture narrower than that of the second end 512b close to the polarization converter 520.

Assuming that the light valve 540 accept a P-type polarization light only, without the polarization converter 520, the light emitted from the light source 500 only has a portion acceptable and thus result in a low intensity. By installing the polarization converter 520, the portion which is not acceptable to the light valve 540, that is, the light other than the P-type polarization, is converted into the P-type polarization to be accepted by the light valve 540. Therefore, the intensity of image displayed can be greatly enhanced.

The taper light pipes 512 and 530 can be optical devices made of plastic material in a low cost since very low power consumption devices are used in the illumination devices. Yet, the objectives of displaying an image with high intensity and uniform light are achieved.

Fifth Embodiment

Figure 6A:
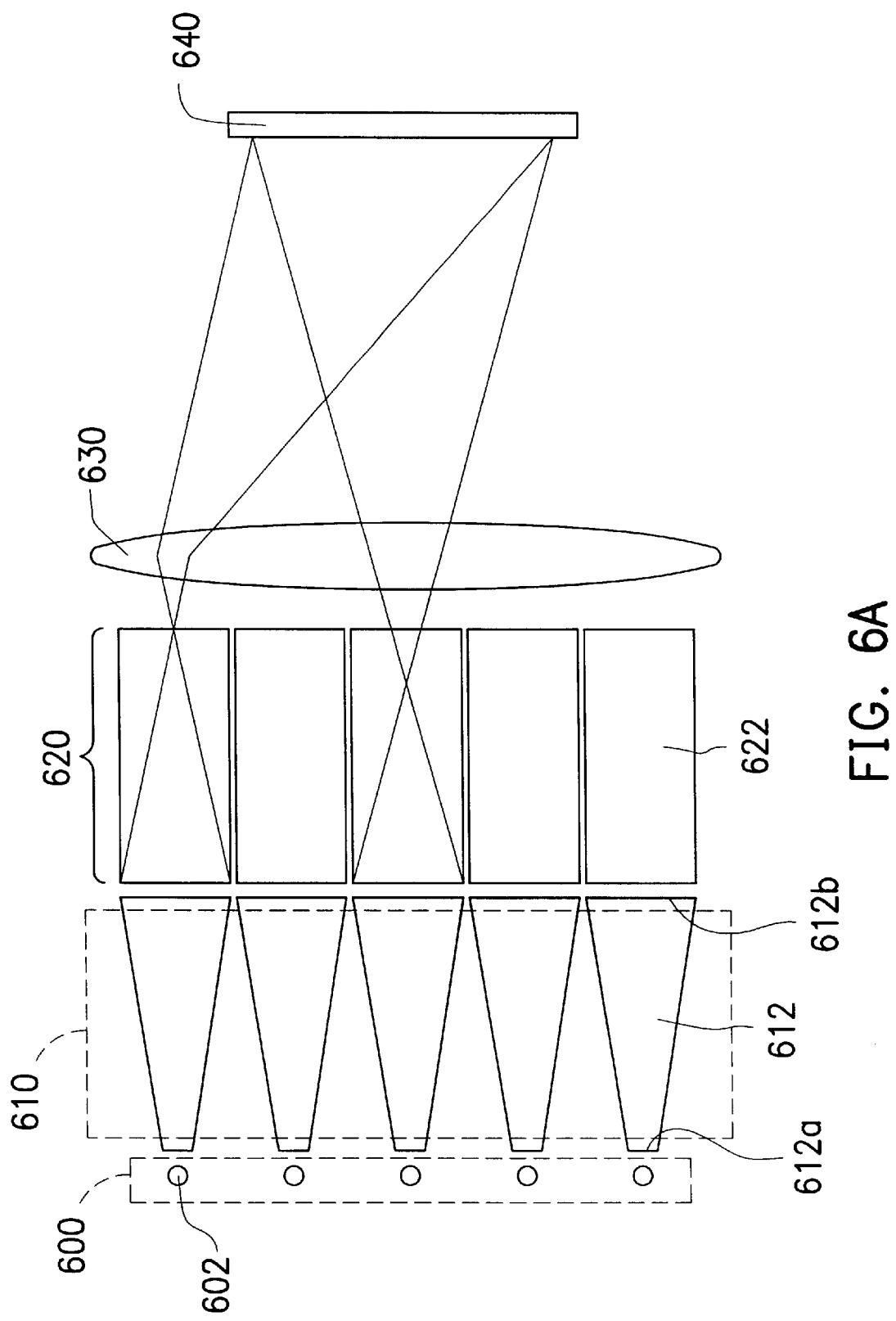
FIG. 6A shows the fifth embodiment of an illumination device of the invention.

FIG. 6A illustrates a fifth embodiment of an illumination device provided by the invention. The illumination device comprises a light source 600, an array of taper light pipes 610, an array of gradient refractive index lens (GRIN) 620 and a light converging means 630. The light source 600 comprises multiple light emitting devices 602 emitting lights with wide angles. The array of taper light pipes 610 comprises multiple taper light pipes 612, and each of which comprises a first end 612a close to the light source 600 and a second end 612b close to the gradient refractive index lens 620. The wide angle lights are then collected from first surfaces 612a, totally reflected by inner surfaces of the array of taper light pipes 610, and are incident from the second ends 612b onto the array of gradient refractive index lens 620 with narrow angles. The array of gradient refractive index lens 620 comprises multiple gradient refractive index lenses 622 arranged in front of the array of taper light pipes 610 to collect the light coming from the second ends 612b. Traveling through these gradient refractive index lenses 622, the light is further converged by the converging means 630, for example, a lens such as a concave lens, to project onto a light valve 640.

The light emitting devices 602 are selected from low power consumption light emitting devices such as light emitting diodes, organic light emitting diodes, laser diodes, electro-luminescence devices, field emission devices, and cold cathode fluorescence lamps. The light valve can be a liquid crystal display.

Being emitted from each of the light emitting devices 602, each light enters each taper light pipe 612 and being totally reflected. The light is then converged as a narrow angle light. In addition to the cone shape, the shape of the taper light pipes 612 can also be a rectangular shape or a cylindrical shape. In the cone shape, the first end 612a close to the light source 500 has an aperture narrower than that of the second end 612b close to the gradient refractive index lens 620.

A uniform and narrow angle coming each of the taper light pipes 612 is further focused and converged by the array of gradient refractive index lens 620 and the converging means 630, respectively, to be incident onto the light valve 640.

Figure 6B:
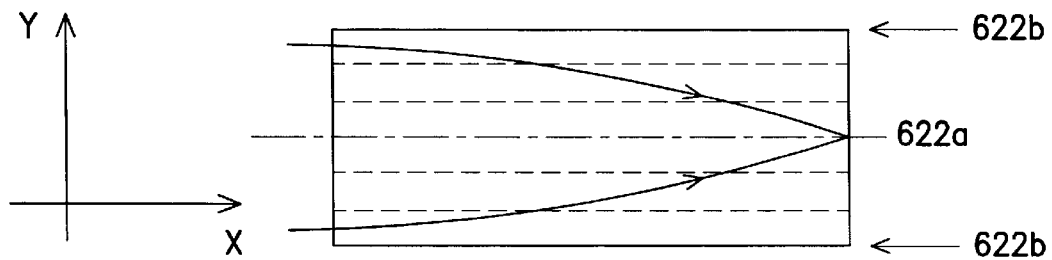
FIG. 6B shows a theory of a gradient reflective lens used in FIG. 6A.

Referring to FIG. 6B, the mechanism of the gradient refractive index lens 622 is illustrated. The optical axis (X-direction) of the gradient refractive index lens 622 is denoted as a reference numeral 622a. The edge of the gradient refractive index lens 622 is denoted as 622b. Along a Y-direction perpendicular to the optical axis 622a, the refractive gradually decreases. Thus, when a light is incident onto the gradient refractive index lens 622, it is gradually deflected. The gradient refractive index lens 622 is thus equivalent to a focusing means.

Figure 6C:
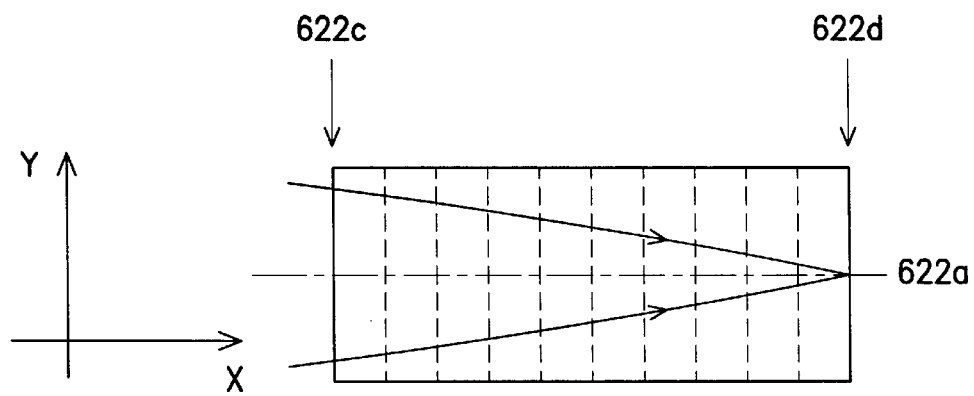
FIG. 6C shows another theory of a gradient reflective lens used in FIG. 6A.

FIG. 6C illustrates another type of gradient refractive index lens 622. Optical devices with various refractive indices are arranged along the optical axis 622a. At the edge 622c, the refractive index is low, while the refractive index is higher and higher up to another edge 622d. Thus, when a light is incident from the edge 622c, it is converged.

The taper light pipes 612 and 630 can be optical devices made of plastic material in a low cost since very low power consumption devices are used in the illumination devices. Yet, the objectives of displaying an image with high intensity and uniform light are achieved.

Sixth Embodiment

FIG. 7 shows a sixth embodiment of an illumination device according to the invention. The illumination device comprises a light source 700, an array of taper light pipes 710, an array of gradient refractive index lens 720, a polarization converter 730 and a converging means 740. The light source 700 comprises multiple light emitting devices 702. The array of taper light pipes 710 comprises multiple taper light pipes 712. The number of the light emitting devices 702 can be designed the same as the number of the taper light pipes 712. Or alternatively, one taper light pipe 712 may be arranged with more than one light emitting device 702 to have a higher intensity of light coming through. Each of the taper light pipes 712 has a first end 712a facing the light emitting devices 702 and a second end 712b facing the gradient refractive index lens 720. When light enters each of the taper light pipes 712, the light travels in a way of total reflection by the inner wall of the taper light pipes 712. In addition, the incident from the light source 700 typically has a wide angle; while the taper light pipes 712 have an effect of narrowing the angle of the light. Therefore, the light coming from the second ends 712b have a narrowed angle compared to the one emitted by the light source 700. In this embodiment, an array of gradient refractive index lenses 720 is inserted between the array of taper light pipes 710 and the polarization converter 730. The polarization converter 730 comprises multiple pairs of polarization beam splitters 732 and 734, and one half-wave plate 736 in front of each second polarization beam splitter 734. Each of the first polarization beam splitters 732 is arranged in parallel to each of the second polarization beam splitters 734. Being converted by the polarization converter 730, all the lights emitted from the light source 700 converged by the array of taper light pipes 710 and focused by the gradient refractive index lenses 720 are converted into a polarization type that a light valve 750 can accept. Before incident onto the light valve 750, a converging means 740 is dispose to further converge the light.

The light emitting devices 702 are selected from low power consumption light emitting devices such as light emitting diodes, organic light emitting diodes, laser diodes, electro-luminescence devices, field emission devices, and cold cathode fluorescence lamps. The light valve can be a liquid crystal display.

Being emitted from each of the light emitting devices 702, each light enters each taper light pipe 712 and being totally reflected. The light is then converged as a narrow angle light. In addition to the cone shape, the shape of the taper light pipes 712 can also be a rectangular shape or a cylindrical shape. In the cone shape, the first end 712a close to the light source 700 has an aperture narrower than that of the second end 712b close to the gradient refractive index lenses 720.

Assuming that the light valve 750 accept a P-type polarization light only, without the polarization converter 730, the light emitted from the light source 700 only has a portion acceptable and thus results in a low intensity. By installing the polarization converter 720, the portion which is not acceptable to the light valve 750, that is, the light other than the P-type polarization, is converted into the P-type polarization to be accepted by the light valve 750. Therefore, the intensity of image displayed can be greatly enhanced.

Each uniform and narrow angle light coming out from the taper light pipe 712 travels through the gradient refractive index lens 720 before reaching the polarization converter 730 in this embodiment. The theory of the polarization converter 730 can be referred to the previous embodiments. The theory of the gradient refractive index lenses 720 can also be referred to the fifth embodiment while the variation direction of refractive index along the optical axis or perpendicular can be selected as specifically requirement.

The taper light pipes 712 can be optical devices made of plastic material in a low cost since very low power consumption devices are used in the illumination devices. Yet, the objectives of displaying an image with high intensity and uniform light are achieved.

Seventh Embodiment

Figure 8:
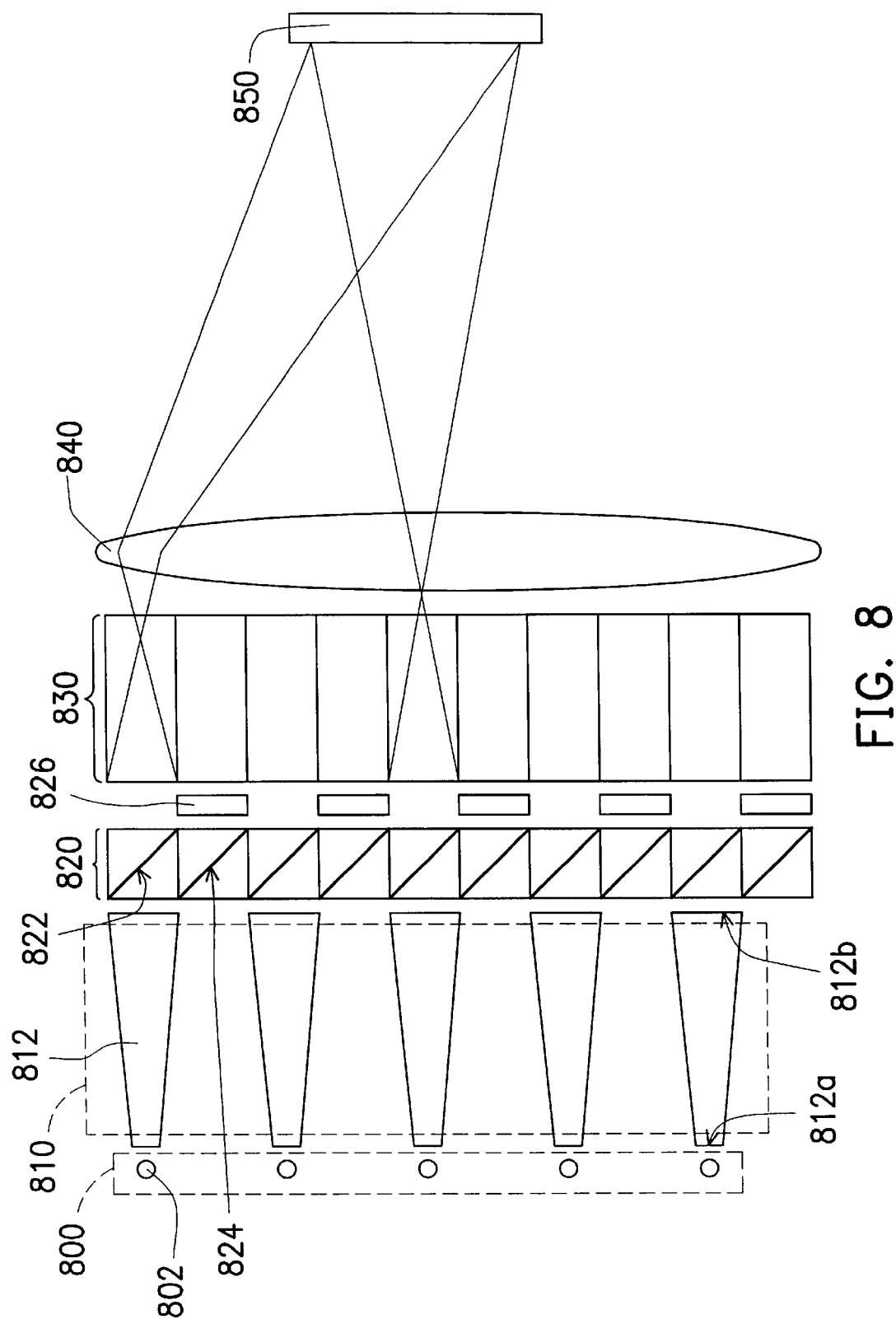
FIG. 8 shows the seventh embodiment of an illumination device of the invention.

FIG. 8 shows a sixth embodiment of an illumination device according to the invention. The illumination device comprises a light source 800, an array of taper light pipes 810, a polarization converter 820, an array of gradient refractive index lens 830, and a converging means 840. The light source 800 comprises multiple light emitting devices 802. The array of taper light pipes 810 comprises multiple taper light pipes 812. The number of the light emitting devices 802 can be designed the same as the number of the taper light pipes 812. Or alternatively, one taper light pipe 812 may be arranged with more than one light emitting device 802 to have a higher intensity of light coming through. Each of the taper light pipes 812 has a first end 812a facing the light emitting devices 802 and a second end 812b facing the polarization converter 820. When light enters each of the taper light pipes 812, the light travels in a way of total reflection by the inner wall of the taper light pipes 812. In addition, the incident from the light source 800 typically has a wide angle; while the taper light pipes 812 have an effect of narrowing the angle of the light. Therefore, the light coming from the second ends 812b have a narrowed angle compared to the one emitted by the light source 800. The polarization converter 820 comprises multiple pairs of polarization beam splitters 832 and 834, and one half-wave plate 836 in front of each second polarization beam splitter 834. Each of the first polarization beam splitters 822 is arranged in parallel to each of the second polarization beam splitters 824. In this embodiment, an array of gradient refractive index lenses 830 is inserted between the polarization converter 820 and the converging means 840. Being converted by the polarization converter 820, all the lights emitted from the light source 800 converged by the array of taper light pipes 810 are converted into a polarization type and focused by the gradient refractive index lenses 830 that a light valve 850 can accept. Before incident onto the light valve 850, a converging means 840 is dispose to further converge the light.

The light emitting devices 802 are selected from low power consumption light emitting devices such as light emitting diodes, organic light emitting diodes, laser diodes, electro-luminescence devices, field emission devices, and cold cathode fluorescence lamps. The light valve can be a liquid crystal display.

Being emitted from each of the light emitting devices 802, each light enters each taper light pipe 812 and being totally reflected. The light is then converged as a narrow angle light. In addition to the cone shape, the shape of the taper light pipes 812 can also be a rectangular shape or a cylindrical shape. In the cone shape, the first end 812a close to the light source 800 has an aperture narrower than that of the second end 812b close to the polarization converter 820.

Assuming that the light valve 850 accept a P-type polarization light only, without the polarization converter 820, the light emitted from the light source 800 only has a portion acceptable and thus results in a low intensity. By installing the polarization converter 820, the portion which is not acceptable to the light valve 850, that is, the light other than the P-type polarization, is converted into the P-type polarization to be accepted by the light valve 850. Therefore, the intensity of image displayed can be greatly enhanced.

Each uniform and narrow angle light coming out from the taper light pipe 812 travels through the polarization converter 820 before reaching the gradient refractive index lens 820 in this embodiment. The theory of the polarization converter 820 can be referred to the previous embodiments. The theory of the gradient refractive index lenses 830 can also be referred to the fifth embodiment while the variation direction of refractive index along the optical axis or perpendicular can be selected as specifically requirement.

The taper light pipes 812 can be optical devices made of plastic material in a low cost since very low power consumption devices are used in the illumination devices. Yet, the objectives of displaying an image with high intensity and uniform light are achieved.

Eighth Embodiment

Figure 9A:
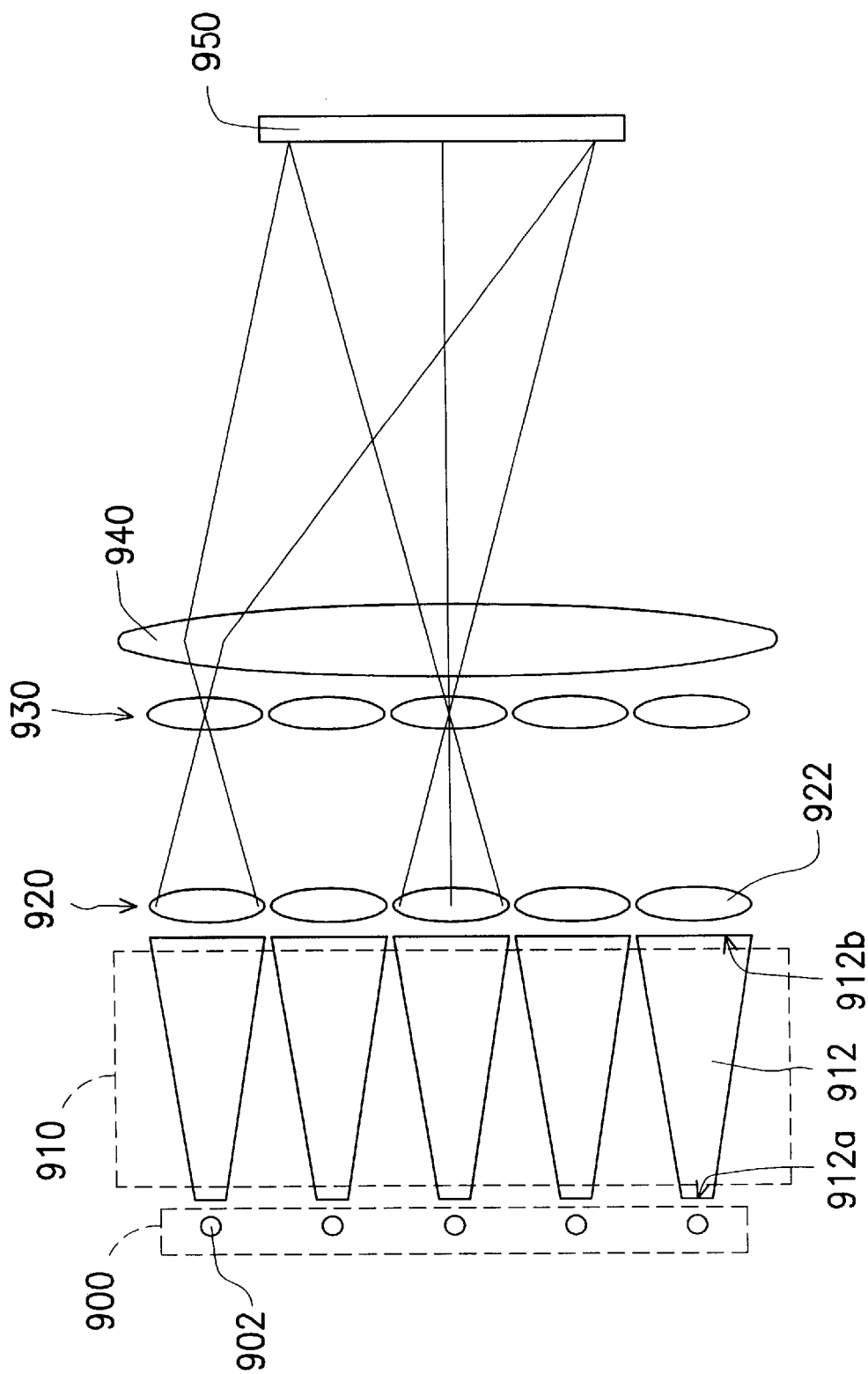
FIG. 9A shows the eighth embodiment of an illumination device of the invention.

FIG. 9A shows a eighth embodiment of an illumination device according to the invention. The illumination device comprises a light source 800, an array of taper light pipes 910, a first array of lens 920, a second array of lens 930 and a converging means 940. The light source 900 comprises multiple light emitting devices 902. The array of taper light pipes 910 comprises multiple taper light pipes 912. The number of the light emitting devices 902 can be designed the same as the number of the taper light pipes 912. Or alternatively, one taper light pipe 912 may be arranged with more than one light emitting device 902 to have a higher intensity of light coming through. Each of the taper light pipes 912 has a first end 912a facing the light emitting devices 902 and a second end 912b facing the first array of lens 920. When light enters each of the taper light pipes 912, the light travels in a way of total reflection by the inner wall of the taper light pipes 912. In addition, the incident from the light source 900 typically has a wide angle; while the taper light pipes 912 have an effect of narrowing the angle of the light. Therefore, the light coming from the second ends 912b have a narrowed angle compared to the one emitted by the light source 900. In this embodiment, a first array of lens comprising multiple first lenses 922 is inserted in front of the array of taper light pipes 910. The light coming out from the second ends of the taper light pipes 910 is collected by the first array of lens 920. The light further travels through the second array of lens 930, and is then converged by the converging means 940, and received by a light valve 950.

The light emitting devices 902 are selected from low power consumption light emitting devices such as light emitting diodes, organic light emitting diodes, laser diodes, electro-luminescence devices, field emission devices, and cold cathode fluorescence lamps. The light valve can be a liquid crystal display.

Being emitted from each of the light emitting devices 902, each light enters each taper light pipe 912 and being totally reflected. The light is then converged as a narrow angle light. In addition to the cone shape, the shape of the taper light pipes 912 can also be a rectangular shape or a cylindrical shape. In the cone shape, the first end 912a close to the light source 900 has an aperture narrower than that of the second end 912b close to the first array of lens 920.

Figure 9B:
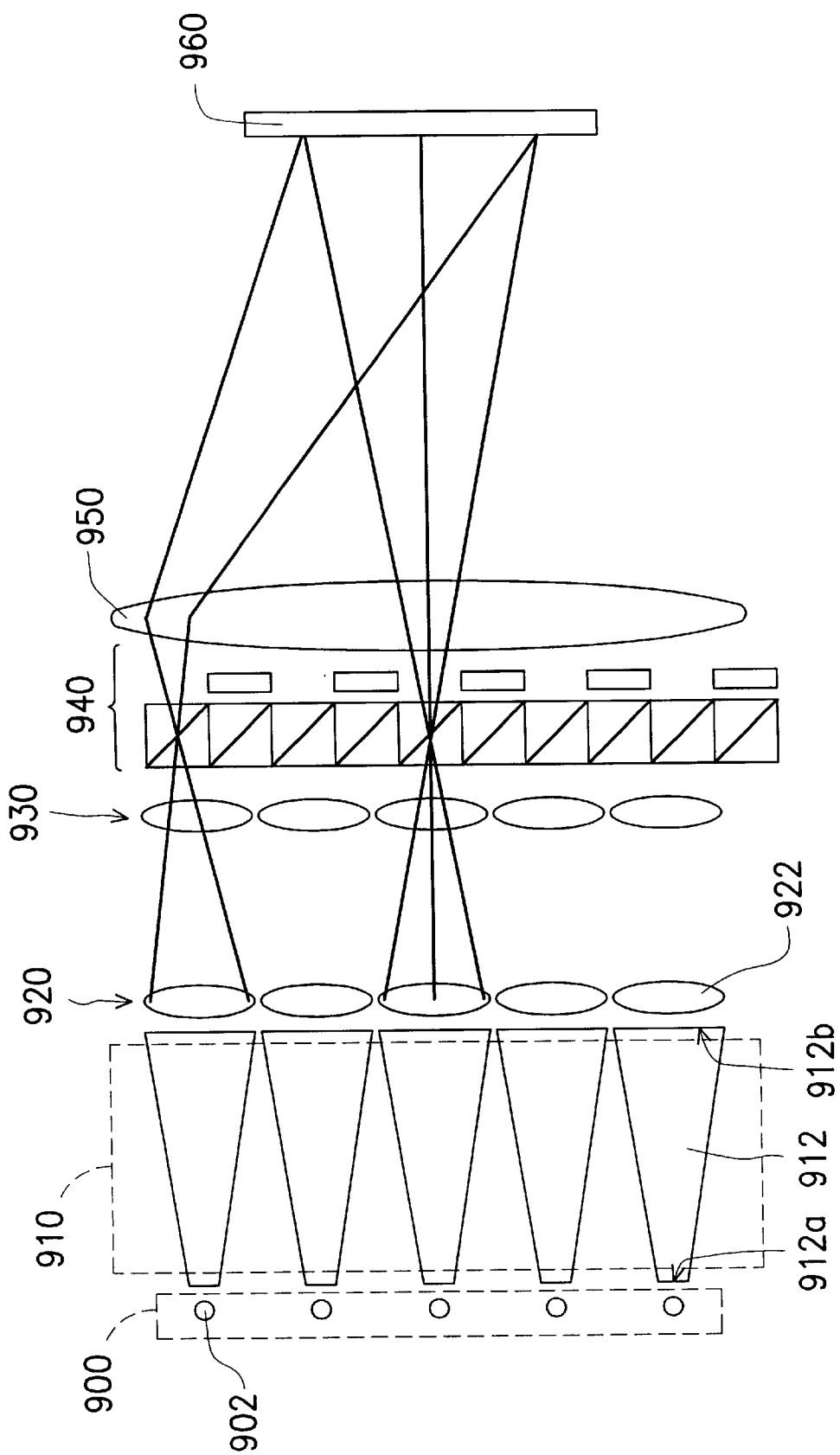
FIG. 9B shows a modification of the eighth embodiment as shown in FIG. 9A.

Assuming that the light valve 960 accept a P-type polarization light only, referring to FIG. 9B, a modification with the installation of a polarization converter 940 in front of the second array of lens 930, is provided. The light emitted from the light source 900 only has a portion acceptable and thus results in a low intensity. By installing the polarization converter 940, the portion which is not acceptable to the light valve 960, that is, the light other than the P-type polarization, is converted into the P-type polarization to be accepted by the light valve 960. Therefore, the intensity of image displayed can be greatly enhanced.

The taper light pipes 912, the lenses 922 and 930, and the converging means 940 in FIG. 9A and 950 in FIG. 9B can be optical devices made of plastic material in a low cost since very low power consumption devices are used in the illumination devices. Yet, the objectives of displaying an image with high intensity and uniform light are achieved.

Ninth Embodiment

Figure 1A:
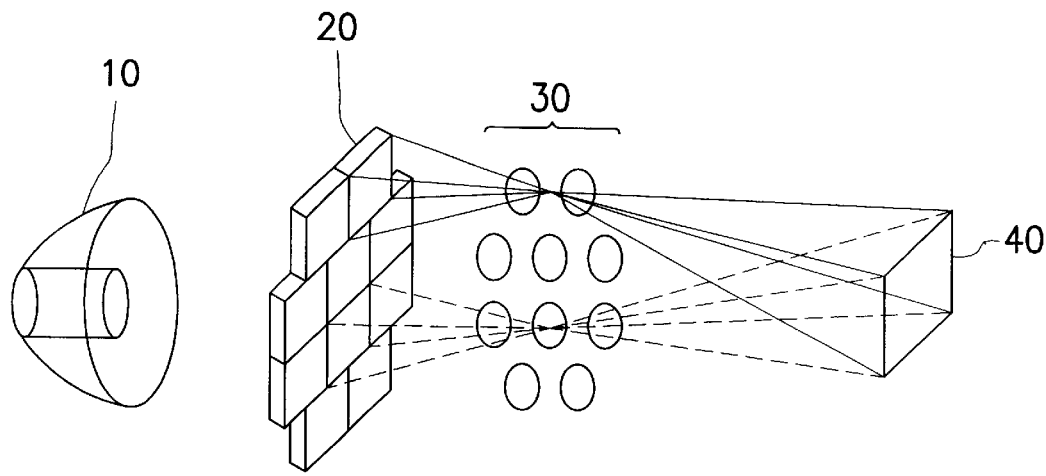
FIG. 1A and FIG. 1B schematically show two conventional illumination devices.
Figure 1B:
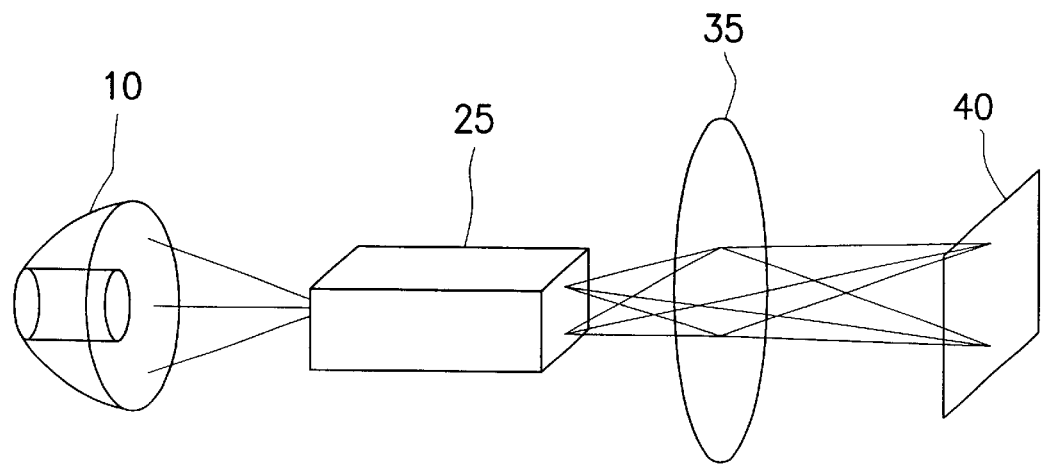
Figure 11:
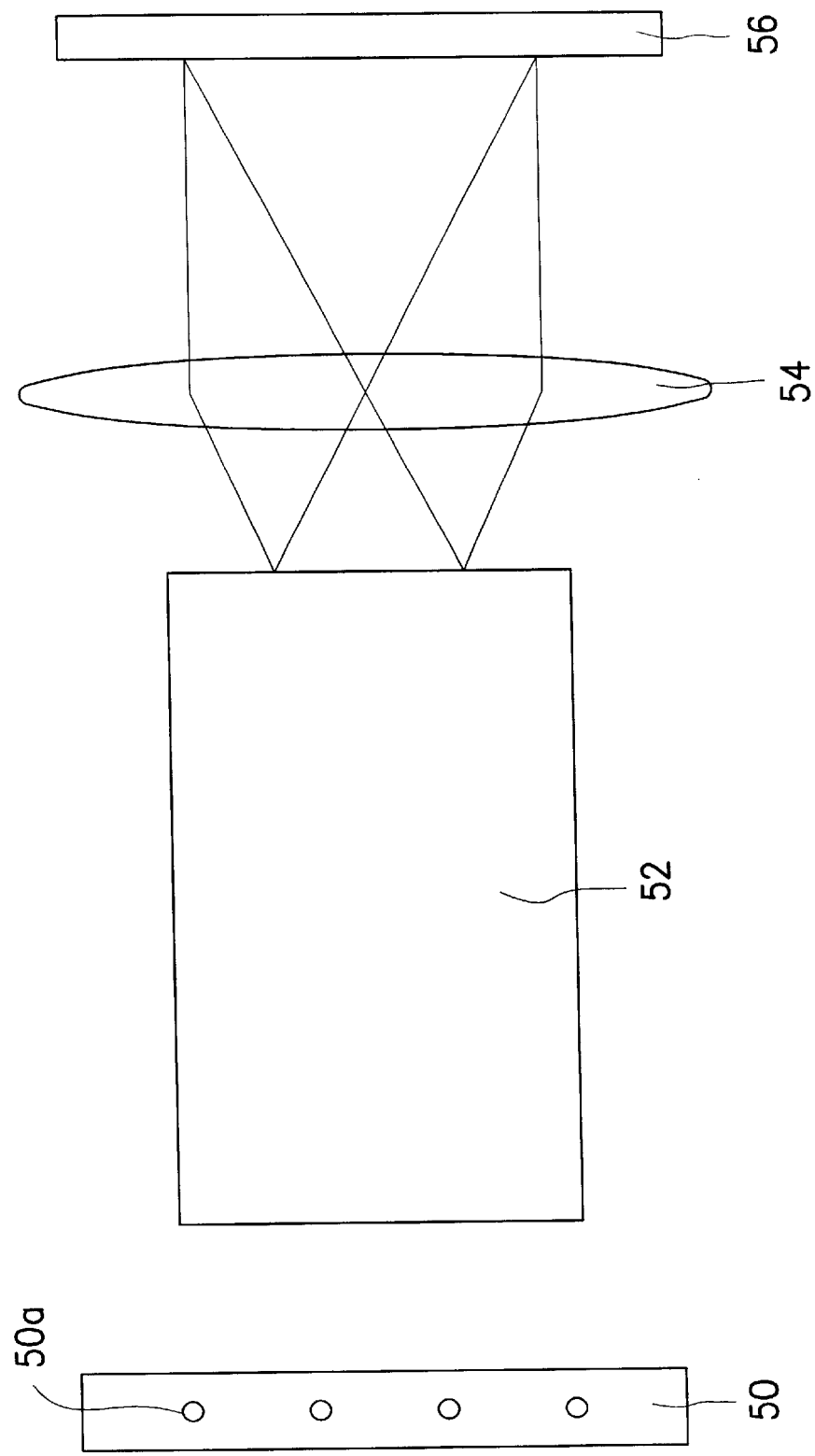
FIG. 11 shows the ninth embodiment of an illumination device of the invention.

FIG. 11 shows another embodiment in which the structure of the illumination device as shown in FIG. 1B is modified. In FIG. 11, instead of using a lamp, a light source 50 comprising one or multiple light emitting modules 50a is provided. A rod integrator 52 is disposed in front of the light source. Due to the distribution of incident light angles, different numbers of total reflection are resulted within the rod integrator 52. The light beam having one total reflection within the rod integrator 52 pushes a light being reflected. The light is then converged as a virtual light source. Similarly, the light beam having twice total reflections pushes the reflected light backward to form another virtual light source. The total reflection upon four walls of the rod integrator 52 thus forms a virtual image array. Each of the virtual light source is incident on an exit surface of the light pipe integrator to result in a kaleidoscope effect, so as to result a light uniform effect. The uniform light is then incident on a light valve 56 being through a condenser 54.

Tenth Embodiment

Figure 10:
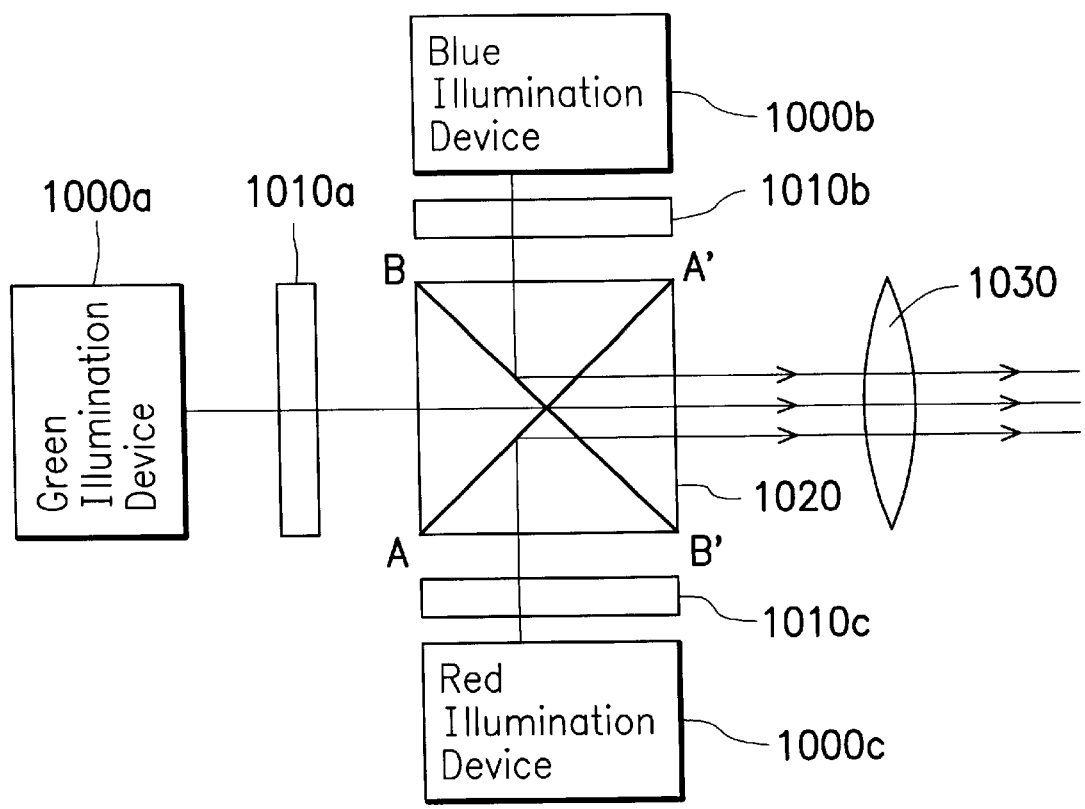
FIG. 10 shows an embodiment of a projection apparatus in the invention.

FIG. 10 illustrates an embodiment of an image display apparatus including the illumination devices according to the invention. The image display apparatus includes a green illumination device 1000a with a green light valve 1010a, a blue illumination device 1000b with a blue light valve 1010b and a red illumination device 1000c with a red light valve 1010c, a color synthesizing means 1020 and a object lens 1030. The green, blue, red illumination devices 1000a–c can be selected from any of the illumination devices described in the first to the eighth embodiments.

Using the illumination devices as described in previous embodiments, a uniform green light, a uniform blue light, and a uniform red light are obtained while projecting from the green, blue and red light valves 1010a–c. These three lights are then synthesized in the color synthesizing means 1020 comprising, for example, X shape dichroic prism.

In the X shape dichroic prism, red and green lights can transmit through a BB' plane while a blue light is reflected. For an AA' plane, the red light is reflected while the blue and green lights can transmit through. In this manner, three elementary color lights R, G, B can be synthesized. The synthesized light is then projected onto a screen via a projection object lens 1030.

The invention applies low power consumption light emitting devices into illumination devices. The illumination devices thus have advantages such as low power consumption, long lifetime, less thermal loss.

Optical devices made of plastic materials can be used in this invention. Therefore, the illumination device or even the image display apparatus can be fabricated with a low cost.

Uniform illuminating means and polarization converter are applied into the illumination devices. Therefore, a uniform light with a high intensity can be realized.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An illumination device, comprising:
   at least a light source;
   at least an array of taper light pipes, disposed in front of the light source; and
   a uniform illuminating means comprising a guiding taper light pipe, disposed in front of the array taper light pipes and covering a range of the array of taper light pipes from which a light is coming out.

2. The illumination device according to claim 1, wherein the light source comprises a plurality of light emitting devices.

3. The illumination device according to claim 2, wherein the light emitting devices are selected from a group of optical devices consisting of light emitting diodes, organic light emitting diodes, laser diodes, electro-luminescence devices, field emission displays, and cold cathode fluorescence lamps.

4. The illumination device according to claim 1, wherein the array of taper light pipes has multiple taper light pipes through which a light emitted from the light source travels in a form of total reflection.

5. The illumination device according to claim 1, comprising further a plurality of polarization converters in front of the uniform illuminating means.

6. The illumination device according to claim 1, comprising further a polarization converter between the array of taper light pipes and the uniform illuminating means.

7. The illumination device according to claim 6, wherein the polarization converter comprising a pair of parallel polarization beam splitters disposed with an angle to a surface of the array of glass taper rods from which a light coming out, and a half-wave plate.

8. The illumination device according to claim 1, comprising further a plurality of the light sources incorporated with a plurality of the arrays of taper light pipes and a plurality of polarization converters.

9. The illumination device according to claim 1, comprising further a number of polarization converters between the light source and the uniform illuminating means, wherein the number of the polarization converter is equal to the number of the taper light pipes.

10. The illumination device according to claim 1, comprising further a polarization converter in front of the uniform illuminating means.

11. An illumination device, comprising:
    a plurality of light emitting devices;
    at least an array of taper light pipes, disposed in front of the light source; and
    a uniform illuminating means, disposed in front of the array taper light pipes and covering a range of the array of taper light pipes from which a light is coming out.

12. An illumination device, comprises:
    at least a light source;
    at least an array of taper light pipes, disposed in front of the light source;
    an array of gradient refractive index lenses, disposed in front of the array of taper light pipes to cover a surface range from which a light coming out; and
    a converging means, in front of the array of gradient refractive index lenses.

13. The illumination device according to claim 12, wherein the light source comprises a plurality of light emitting devices selected from low power consumption devices.

14. The illumination device according to claim 13, wherein the light emitting devices include one selected from the group consisting of light emitting diodes, organic light emitting diodes, laser diodes, electro-luminescence devices, field emission displays, and cold cathode fluorescence lamps.

15. The illumination device according to claim 12, wherein the array of gradient refractive index lenses has a number of gradient refractive index lenses, wherein the number of gradient refractive index lenses is equal to the number of the taper light pipes.

16. The illumination device according to claim 12, comprising further a plurality of polarization converters between the array of the gradient refractive index lenses and the converging means.

17. The illumination device according to claim 16, wherein a number of the polarization converters is the same as a number of the gradient refractive index lenses.

18. The illumination device according to claim 12, comprising further a plurality of polarization converters between the array of taper light pipes and the array of the gradient refractive index lenses.

19. The illumination device according to claim 18, wherein a number of the polarization converters is the same as a number of the gradient refractive index lenses.

20. An illumination device, comprising:
   at least a light source;
   at least an array of taper light pipes, disposed in front of the light source;
   a first lens array in front of the array of the taper light pipes;
   a second lens array in front of the first lens array;
   a plurality of polarization converters in front of the second lens array; and
   a converging means in front of the polarization converters.

21. The illumination device according to claim 20, wherein the light source comprises a plurality of light emitting devices selected from low power consumption devices.

22. The illumination device according to claim 21, wherein the light emitting devices, the taper light pipes, a plurality of first lenses in the first lens array, and a plurality of second lenses of the second lens array have an equal amount.

23. An image projecting apparatus, comprising:
   a green illumination device;
   a green light valve with respect to the green illumination device to collect a green light emitted from the green illumination device;
   a blue illumination device;
   a blue light valve with respect to the blue illumination device to collect a blue light emitted from the blue illumination device;
   a red illumination device;
   a red light valve with respect to the red illumination device to collect a red light emitted from the red illumination device;
   a color synthesizing means located at a position, to receive and synthesize the green light, the blue light and the red light transmitting through the green, blue and red light valves; wherein each of the green, blue, and red illumination devices further comprising at least:
   a light source;
   an array of taper light pipes; and
   a uniformizing device.

24. The image projecting apparatus according to claim 23, wherein the color synthesizing means includes a dichroic prism.

25. The image projecting apparatus according to claim 23, wherein each of the green, blue and red illumination devices further comprise a polarization converter between the array of taper light pipes and the uniform illuminating means.

26. The image projecting apparatus according to claim 23, wherein each of the green, blue and red illumination devices further comprise a polarization converter in front of the uniform illuminating means.

27. The image projecting apparatus according to claim 23, wherein the uniform illuminating means includes an array of gradient refractive index lenses.

28. The image projecting apparatus according to claim 23, wherein the uniform illuminating means includes a first lens array and a second lens array.

* * * * *